US012613127B2

(12) United States Patent
Yoda et al.

(10) Patent No.: US 12,613,127 B2
(45) Date of Patent: Apr. 28, 2026

(54) ENGINEERING WORK OPTICAL DETECTION DEVICE AND METHOD

(71) Applicant: NEC Corporation, Tokyo (JP)

(72) Inventors: Yukihide Yoda, Tokyo (JP); Tadayuki Iwano, Tokyo (JP); Koyo Mori, Tokyo (JP)

(73) Assignee: NEC CORPORATION, Tokyo (JP)

( * ) Notice: Subject to any disclaimer, the term of this patent is extended or adjusted under 35 U.S.C. 154(b) by 297 days.

(21) Appl. No.: 18/279,142

(22) PCT Filed: Mar. 4, 2021

(86) PCT No.: PCT/JP2021/008374
§ 371 (c)(1),
(2) Date: Aug. 28, 2023

(87) PCT Pub. No.: WO2022/185469
PCT Pub. Date: Sep. 9, 2022

(65) Prior Publication Data
US 2024/0125642 A1 Apr. 18, 2024

(51) Int. Cl.
*G01H 9/00* (2006.01)
*G01M 11/00* (2006.01)
(52) U.S. Cl.
CPC ............ *G01H 9/004* (2013.01); *G01M 11/30* (2013.01)
(58) Field of Classification Search
None
See application file for complete search history.

(56) References Cited

U.S. PATENT DOCUMENTS

| | | | |
|---|---|---|---|
| 2022/0276089 A1 | 9/2022 | Yoda et al. | |
| 2022/0357421 A1 | 11/2022 | Kojima | |

FOREIGN PATENT DOCUMENTS

| | | | | | |
|---|---|---|---|---|---|
| JP | H0266468 A | * | 3/1990 | | |
| JP | 2001-059719 A | | 3/2001 | | |
| JP | 2002-152937 A | | 5/2002 | | |
| JP | 2005-241431 A | | 9/2005 | | |
| JP | 2013-072800 A | | 4/2013 | | |
| WO | WO-2020044655 A1 | * | 3/2020 | ......... | G01D 5/35358 |
| WO | 2020/255358 A1 | | 12/2020 | | |
| WO | WO-2021010251 A1 | * | 1/2021 | ............ | G01H 9/004 |

OTHER PUBLICATIONS

International Search Report for PCT Application No. PCT/JP2021/008374, mailed on May 18, 2021.
English translation of Written opinion for PCT Application No. PCT/JP2021/008374, mailed on May 18, 2021.

* cited by examiner

*Primary Examiner* — Eric S. McCall
*Assistant Examiner* — Nigel H Plumb
(74) *Attorney, Agent, or Firm* — Sughrue Mion, PLLC

(57) ABSTRACT
The purpose of the present disclosure is to detect the occurrence of engineering work in the surroundings of a utility pole or a pylon using a simple configuration. This engineering work detection device comprises: an optical signal reception unit for receiving an optical signal from an optical fiber cable installed by a method of overhead installation via a utility pole or a pylon; and at least one memory configured to store instructions; and at least one processor configured to execute the instructions to detect, on the basis of a pattern of vibration of the utility pole or the pylon indicated by the optical signal, the occurrence of engineering work in the surroundings of the utility pole or the pylon.

19 Claims, 18 Drawing Sheets

| DISTANCE INFORMATION | IDENTIFICATION INFORMATION |
|---|---|
| xx km | UTILITY POLE 1_1 |
| yy km | UTILITY POLE 1_2 |
| zz km | UTILITY POLE 1_3 |

FS_3

P_3

INTENSITY

FREQUENCY

FS_4

P_4

INTENSITY

FREQUENCY

Fig.18

| VIBRATION DATA | TEACHER DATA |
|---|---|
| VIBRATION PATTERN A | NO DETERIORATION |
| VIBRATION PATTERN B | DETERIORATION (DETERIORATION DEGREE OF 1) |
| VIBRATION PATTERN C | DETERIORATION (DETERIORATION DEGREE OF 2) |

Fig.21A

ENGINEERING WORK DETECTION DEVICE

1

ENGINEERING WORK OPTICAL DETECTION DEVICE AND METHOD

This application is a National Stage Entry of PCT/JP2021/008374 filed on Mar. 4, 2021, the contents of all of which are incorporated herein by reference, in their entirety.

TECHNICAL FIELD

The present disclosure relates to an engineering work detection device and the like.

BACKGROUND ART

When an engineering work occurs in a periphery of a utility pole or a tower on the ground, an overhead electric wire provided to the utility pole or the tower is affected by the engineering work in some cases. As a result, the overhead electric wire may be damaged.

Up till now, a worker is regularly on patrol and thereby confirms whether an overhead electric wire is affected by an engineering work. In view of improvement in efficiency for such confirmation, it is suitable to perform patrol according to occurrence of an engineering work.

Herein, when an engineering work occurs on the ground, a municipal authority is notified in advance as a general rule. With this notification, an occurrence location of the engineering work and an occurrence time and date of the engineering work can be recognized in advance. Thus, patrol can be performed according to occurrence of the engineering work.

However, in recent years, the number of engineering works without such notifications (so-called "unauthorized engineering works") has been increasing. In a case of an unauthorized engineering work, an occurrence location of the engineering work and an occurrence time and date of the engineering work cannot be recognized in advance. Thus, it is difficult to perform patrol according to occurrence of the engineering work.

In view of this, there has been desired a technique of detecting occurrence of an engineering work regardless of presence or absence of a notification. PTL 1 discloses an example of such a technique. Specifically, in the technique described in PTL 1, a vibration sensor is installed under the ground. Occurrence of an engineering work on the ground is detected based on vibration detected by the vibration sensor.

CITATION LIST

Patent Literature

PTL 1: Japanese Unexamined Patent Application Publication No. 2001-59719

SUMMARY OF INVENTION

Technical Problem

In the technique described in PTL 1, it is required to install vibration sensors under the ground along a power transmission network or a power distribution network. Thus, there is a problem that a large-scale installation work is required in advance.

The present disclosure has been made in order to solve the problem as described above, and an object thereof is to detect occurrence of an engineering work in a periphery of a utility pole or a tower with a simple configuration that does not require installation of a vibration sensor under the ground.

Solution to Problem

An engineering work detection device according to one aspect of the present disclosure includes an optical signal reception means for receiving an optical signal from an optical fiber cable provided in an overhead manner via a utility pole or a tower, and an engineering work detection means for detecting occurrence of an engineering work in a periphery of the utility pole or the tower, based on a vibration pattern of the utility pole or the tower that is indicated by the optical signal.

An engineering work detection method according to one aspect of the present disclosure includes receiving, by an optical signal reception means, an optical signal from an optical fiber cable provided in an overhead manner via a utility pole or a tower, and detecting, by an engineering work detection means, occurrence of an engineering work in a periphery of the utility pole or the tower, based on a vibration pattern of the utility pole or the tower that is indicated by the optical signal.

Advantageous Effects of Invention

According to the present disclosure, occurrence of an engineering work in a periphery of a utility pole or a tower can be detected with a simple configuration.

BRIEF DESCRIPTION OF DRAWINGS

FIG. 18 is an explanatory diagram illustrating an example of data to be used for machine learning.

FIG. 21A is an explanatory diagram illustrating an installation example of an engineering work detection device according to a first example embodiment and an optical fiber cable provided overhead via a plurality of utility poles.

EXAMPLE EMBODIMENT

Hereinafter, example embodiments of the present disclosure are described with reference to the drawings.

First Example Embodiment

Figure 21A:
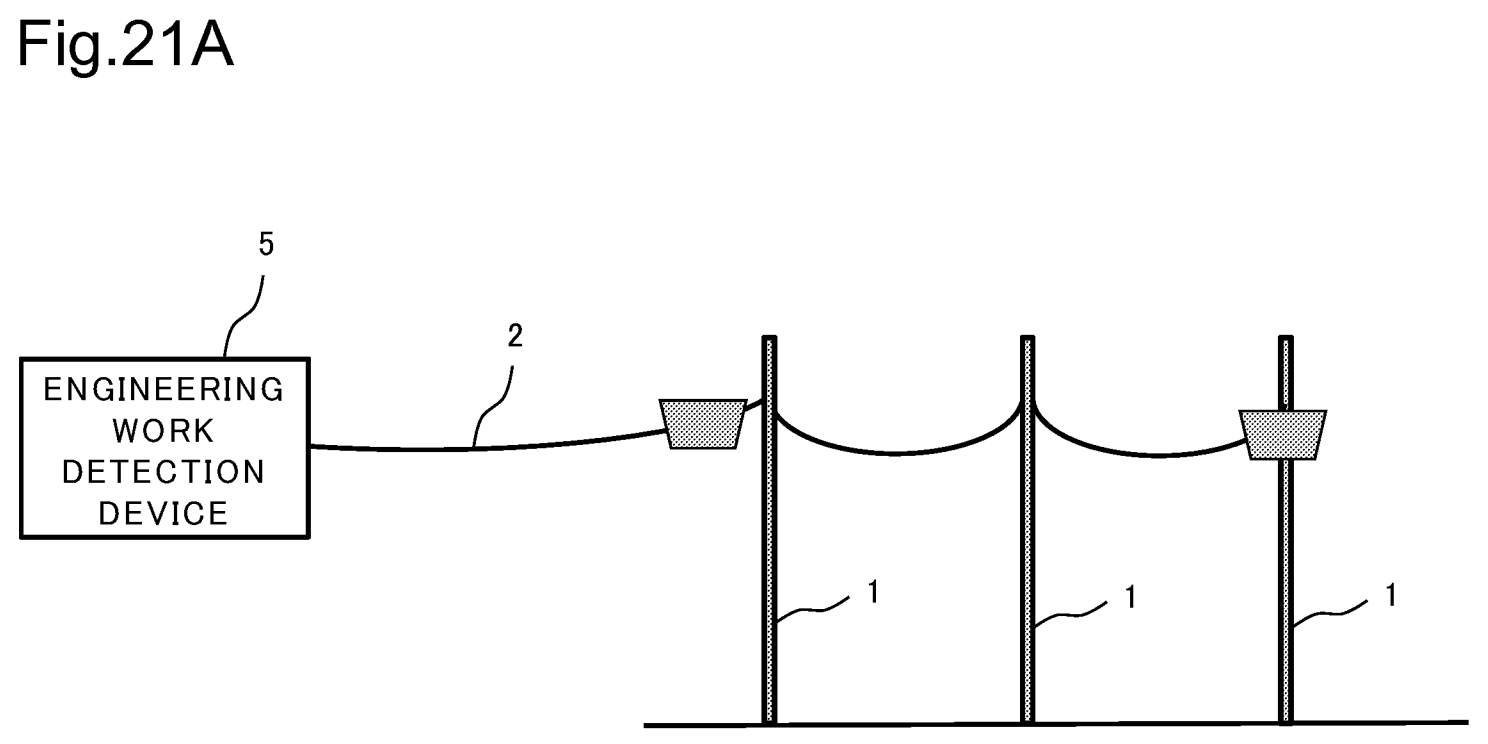
Figure 21B:
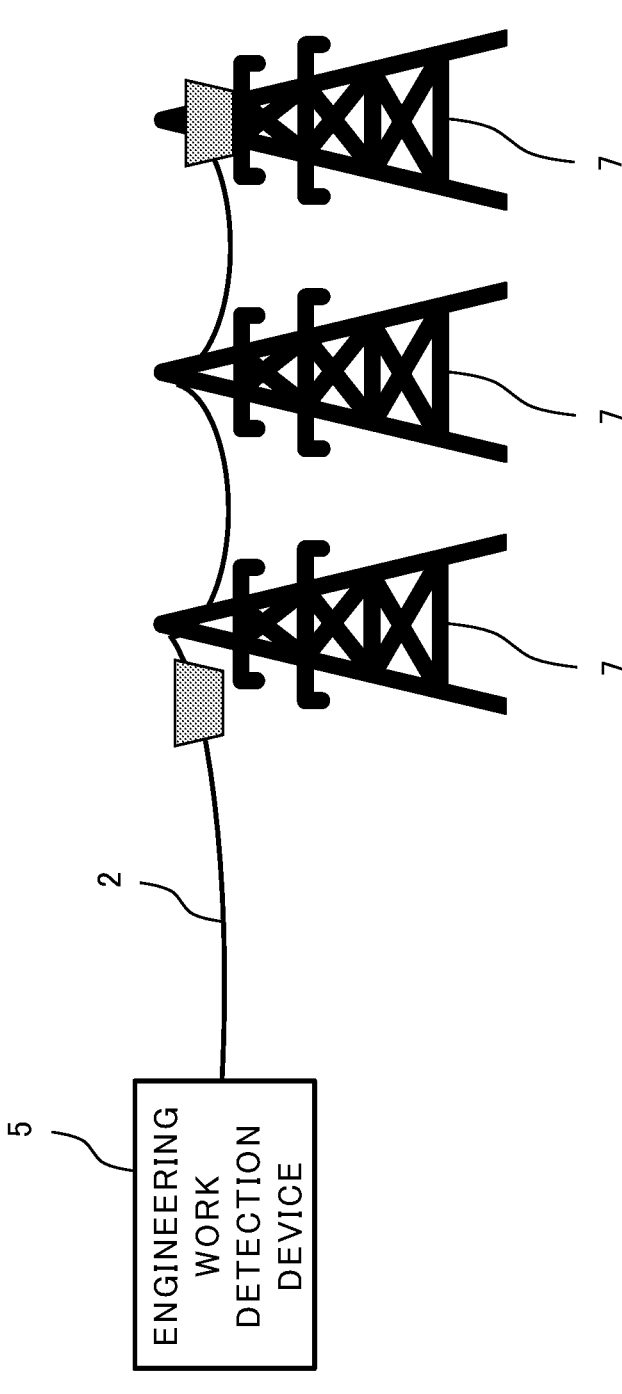
FIG. 21B is an explanatory diagram illustrating an installation example of the engineering work detection device according to the first example embodiment and an optical fiber cable provided overhead via a plurality of towers.

Each of FIG. 21A and FIG. 21B is an explanatory diagram illustrating an engineering work detection device according to a first example embodiment. With reference to FIG. 21A and FIG. 21B, the engineering work detection device according to the first example embodiment is described.

As illustrated in FIG. 21A, an optical fiber cable 2 is provided overhead via a plurality of utility poles 1. Alternatively, as illustrated in FIG. 21B, the optical fiber cable 2 is provided overhead via a plurality of towers 7. At one end of the optical fiber cable 2, an engineering work detection device 5 is provided. The engineering work detection device 5 includes the following functions.

Specifically, the engineering work detection device 5 outputs an optical signal to the optical fiber cable 2. With this, back scattered light is generated inside the optical fiber cable 2. The engineering work detection device 5 receives an optical signal associated with the back scattered light being generated. In other words, the engineering work detection device 5 receives the optical signal from the optical fiber cable 2. The received optical signal includes a pattern that differs according to vibration of each of the utility poles 1 or each of the towers 7. The engineering work detection device 5 uses the received optical signal, and detects occurrence of an engineering work in a periphery of each of the utility poles 1 or each of the towers 7, based on the pattern. Details of the engineering work detection device 5 are described later in a second example embodiment.

In this manner, the engineering work detection device 5 is used for the purpose of detecting occurrence of an engineering work in the periphery of the utility pole 1 or the tower 7. In particular, with a simple configuration that does not require installation of a vibration sensor under the ground, occurrence of the engineering work can be detected.

Second Example Embodiment

Figure 1:
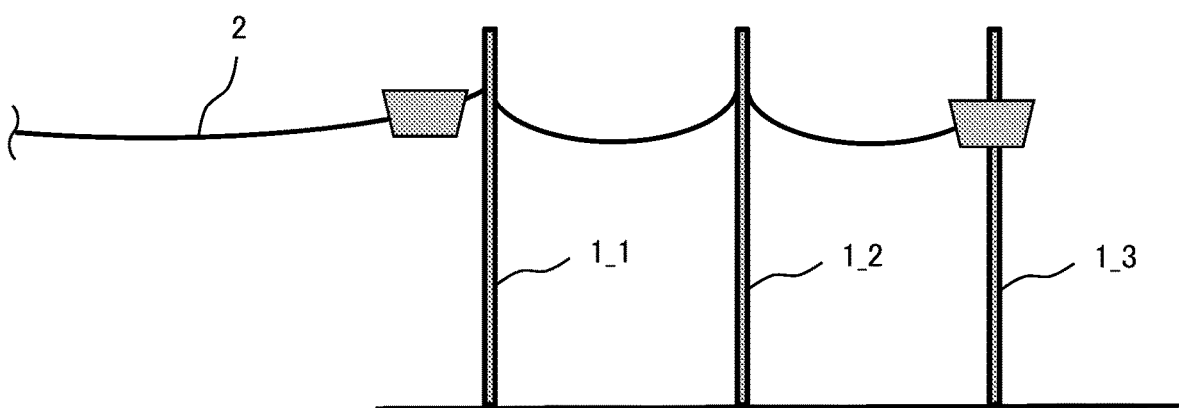
FIG. 1 is an explanatory diagram illustrating an installation example of an optical fiber cable provided overhead via a plurality of utility poles.
Figure 2:
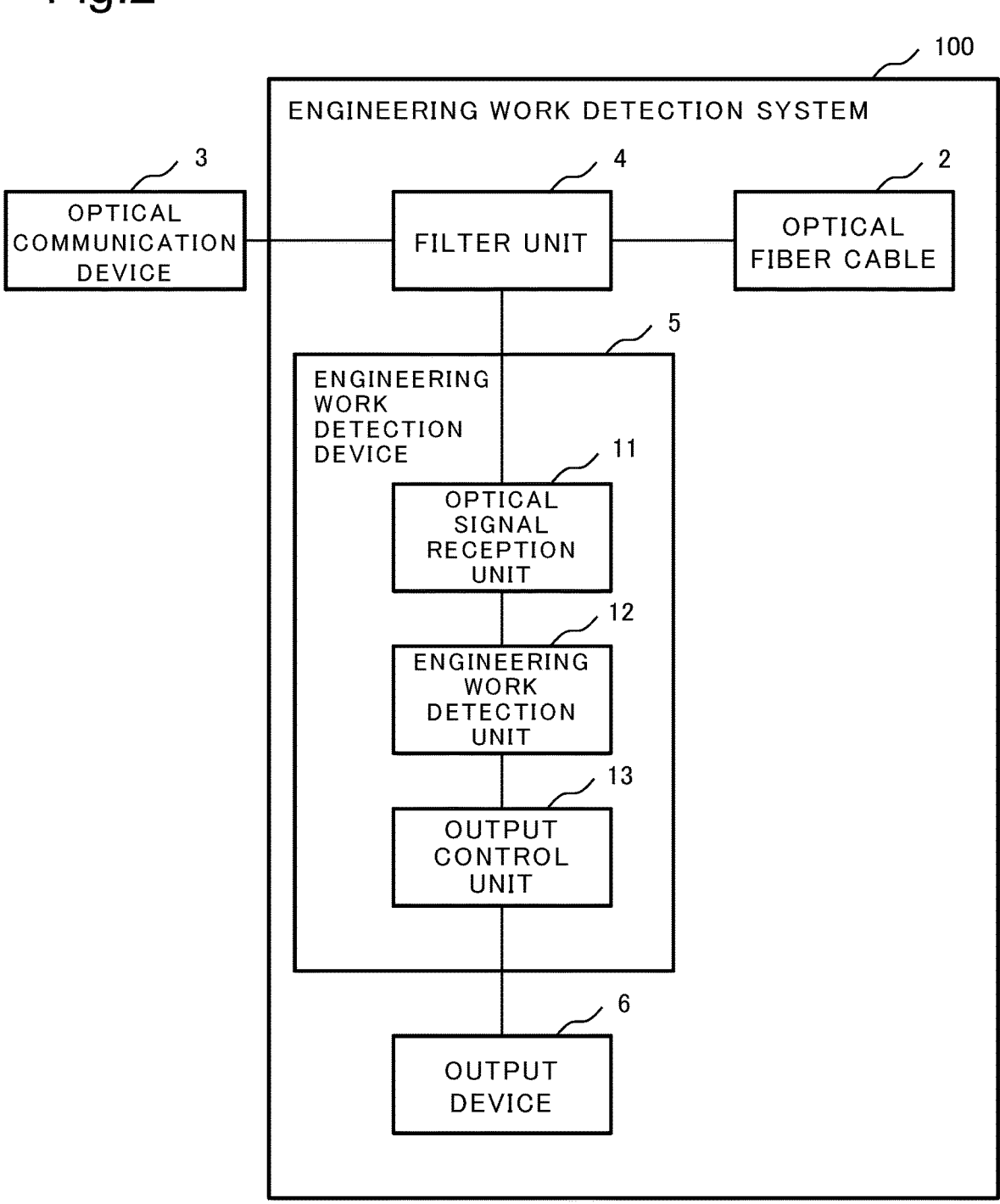
FIG. 2 is a block diagram illustrating main parts of an engineering work detection system according to a second example embodiment.

FIG. 1 is an explanatory diagram illustrating an installation example of an optical fiber cable provided overhead via a plurality of utility poles. FIG. 2 is a block diagram illustrating main parts of an engineering work detection system according to the second example embodiment. With reference to FIG. 1 and FIG. 2, the engineering work detection system according to the second example embodiment is described.

As illustrated in FIG. 1, the optical fiber cable 2 is provided overhead via N utility poles 1_1 to 1_N. Herein, N is an integer equal to or greater than 2. In the example illustrated in FIG. 1, N=3 is satisfied. The utility poles 1_1 to 1_N are included in a power transmission network or a power distribution network. In other words, the utility poles 1_1 to 1_N are for power transmission or power distribution. The optical fiber cable 2 is dedicated for communication or sensing. The optical fiber cable 2 may be provided inside an overhead ground wire. Specifically, an optical fiber composite overhead ground wire (OPGW) may be used as the optical fiber cable 2.

Hereinafter, a case where the optical fiber cable 2 is dedicated for communication is mainly described as an example. The optical fiber cable 2 is used for communication performed by an optical communication device 3 (see FIG. 2). For example, the optical communication device 3 is configured by a terminal device for OPGW. For example, the optical communication device 3 is installed in a building for OPGW.

As illustrated in FIG. 2, an engineering work detection system 100 includes the optical fiber cable 2, a filter unit 4, the engineering work detection device 5, and an output device 6. The engineering work detection device 5 includes an optical signal reception unit 11, an engineering work detection unit 12, and an output control unit 13.

The filter unit 4 is provided between the optical fiber cable 2, the optical communication device 3, and the engineering work detection device 5. When an optical signal from the optical communication device 3 is input, the filter unit 4 outputs the optical signal being input, to the optical fiber cable 2. Further, when an optical signal from the optical fiber cable 2 is input, the filter unit 4 separates a component associated with back scattered light in the signal light being input, and outputs the component to the engineering work detection device 5. The filter unit 4 is configured by using a wavelength filter (more specifically, a three-port wavelength division multiplex filter). With the wavelength filter, an optical signal (having a specific wavelength) being input from the optical communication device 3 is not output to the engineering work detection device 5, but is output to the optical fiber cable 2. In contrast, a component having another specific wavelength (containing a component associated with back scattered light) in the optical signal being input from the optical fiber cable 2 is not output to the optical communication device 3, but is output to the engineering work detection device 5. In this manner, the function of the filter unit 4 is achieved.

The optical signal reception unit 11 receives the optical signal from the optical fiber cable 2. More specifically, as described above, the component associated with the back scattered light is separated by the filter unit 4, and the optical signal containing the separated component is received by the optical signal reception unit 11.

The engineering work detection unit 12 detects occurrence of an engineering work in a periphery of each of the utility poles 1 by using the optical signal that is received by the optical signal reception unit 11. With this, an area in which the engineering work occurs is detected. Specific examples of a detection method performed by the engineering work detection unit 12 are described later with reference to FIG. 7 to FIG. 9B.

The output control unit 13 executes control for outputting an alert when the engineering work detection unit 12 detects occurrence of the engineering work. The alert is output by using the output device 6. For example, the output device 6 includes at least one of a display device, a sound output device, and a communication device. The display device is configured by using a display screen, for example. The sound output device is configured by using a speaker, for example. The communication device is configured by using a dedicated transmitter and a dedicated receiver, for example.

In other words, the output control unit 13 executes control for displaying an alert image. The image is displayed by using the display device in the output device 6. Alternatively, the output control unit 13 executes control for outputting an alert sound. The sound is output by using the sound output device in the output device 6. Alternatively, the output control unit 13 executes control for transmitting an alert signal. The signal is transmitted by using the communication device in the output device 6. A specific example of the alert image is described with reference to FIG. 10.

In this manner, the main parts of the engineering work detection system 100 are configured.

Hereinafter, the optical signal reception unit 11 is referred to as an "optical signal reception means" in some cases. Further, the engineering work detection unit 12 is referred to as a "engineering work detection means" in some cases. Further, the output control unit 13 is referred to as an "output control means" in some cases.

Figure 3:
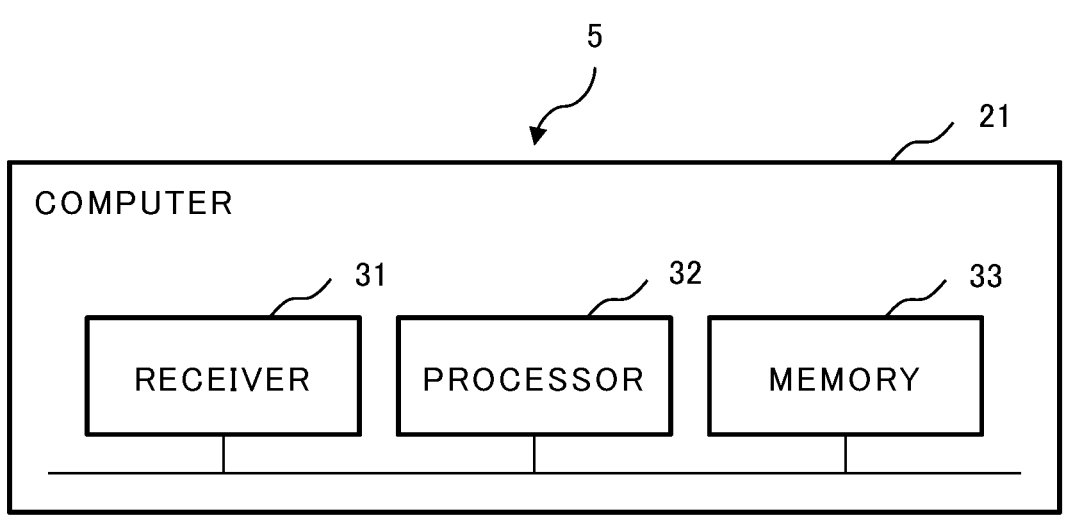
FIG. 3 is a block diagram illustrating a hardware configuration of the main parts of the engineering work detection device according to the second example embodiment.
Figure 4:
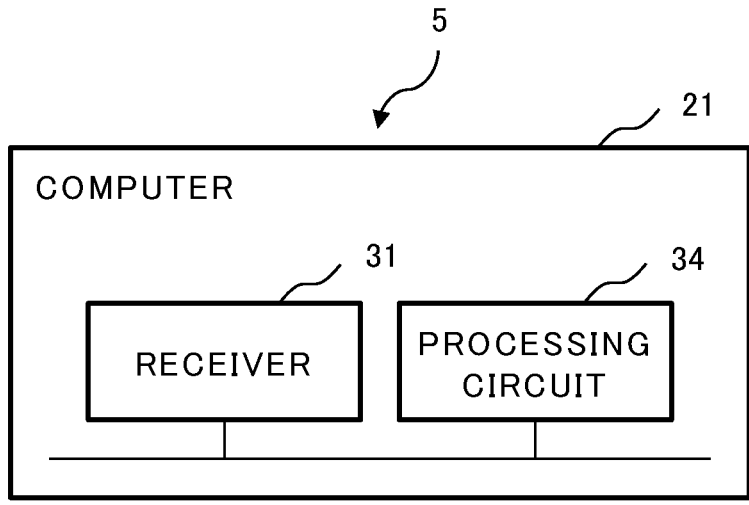
FIG. 4 is a block diagram illustrating another hardware configuration of the main parts of the engineering work detection device according to the second example embodiment.
Figure 5:
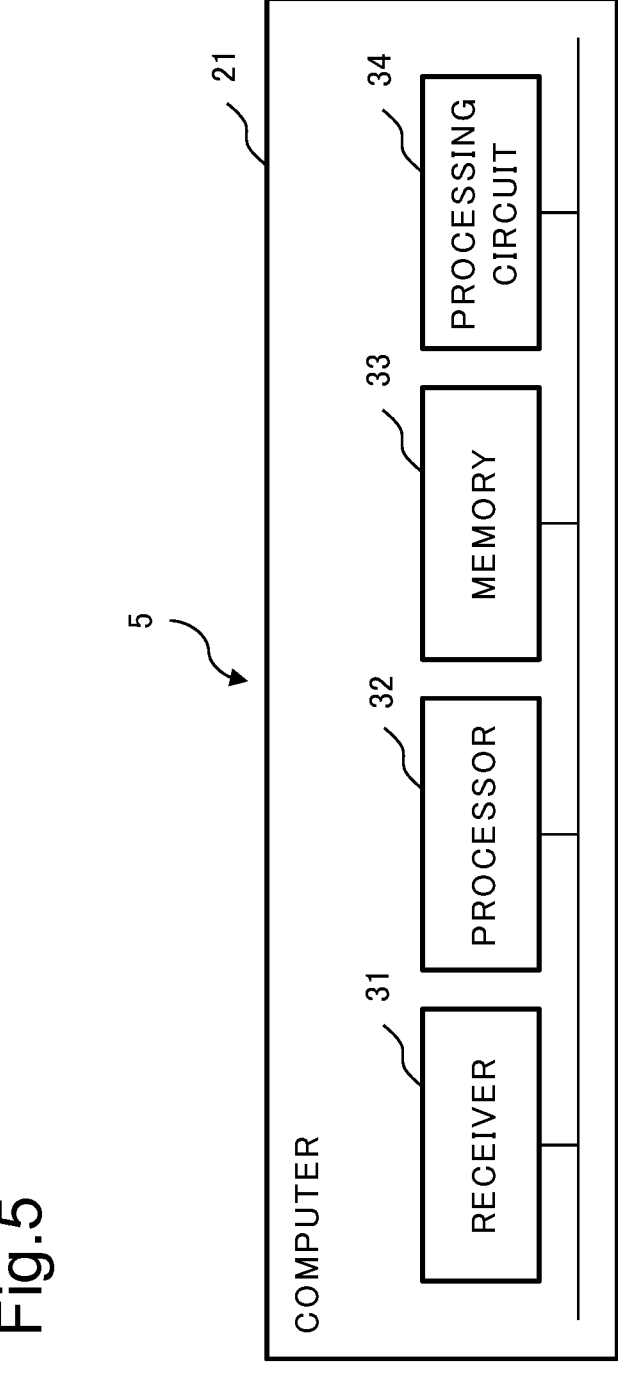
FIG. 5 is a block diagram illustrating another hardware configuration of the main parts of the engineering work detection device according to the second example embodiment.

Next, with reference to FIG. 3 to FIG. 5, a hardware configuration of main parts of the engineering work detection device 5 is described.

As illustrated in FIGS. 3 to 5, the engineering work detection device 5 is configured by using a computer 21. The computer 21 may be provided to the same place as the place where the optical communication device 3 is installed (for example, a building for the OPGW). Alternatively, the computer 21 may be provided to another place (for example, within a cloud network). Alternatively, some of the elements of the computer 21 (more specifically, a receiver 31) may be provided to the same place, and the remaining elements of the computer 21 may be provided to the other place.

As illustrated in FIG. 3, the computer 21 includes the receiver 31, a processor 32, and a memory 33. The memory 33 stores a program for causing the computer 21 to function as the optical signal reception unit 11, the engineering work detection unit 12, and the output control unit 13 (including a program for causing the receiver 31 to function as the optical signal reception unit 11). The processor 32 reads out and executes the program stored in the memory 33. With this, a function F1 of the optical signal reception unit 11, a function F2 of the engineering work detection unit 12, and a function F3 of the output control unit 13 are achieved.

As illustrated in FIG. 4, the computer 21 includes the receiver 31 and a processing circuit 34. The processing circuit 34 executes processing for causing the computer 21 to function as the optical signal reception unit 11, the engineering work detection unit 12, and the output control unit 13 (including processing for causing the receiver 31 to function as the optical signal reception unit 11). With this, the functions F1 to F3 are achieved.

Alternatively, as illustrated in FIG. 5, the computer 21 includes the receiver 31, the processor 32, the memory 33, and the processing circuit 34. In this case, some functions of the functions F1 to F3 are achieved by the processor 32 and the memory 33, and the remaining functions of the functions F1 to F3 are achieved by the processing circuit 34.

The processor 32 is configured by one or more processors. For example, each processor is configured by using a central processing unit (CPU), a graphics processing unit (GPU), a microprocessor, a microcontroller, or a digital signal processor (DSP).

The memory 33 is configured by one or more memories. For example, each memory is configured by using a random-access memory (RAM), a read-only memory (ROM), a flash memory, an erasable programmable read-only memory (EPROM), an electrically erasable programmable read-only memory (EEPROM), a solid-state drive, a hard disk drive, a flexible disk, a compact disc, a digital versatile disc (DVD), a Blu-ray disc, a magneto-optical (MO) disc, or a mini disc.

The processing circuit 34 is configured by one or more processing circuits. For example, each processing circuit is configured by using an application specific integrated circuit (ASIC), a programmable logic device (PLD), a field programmable gate array (FPGA), a system on a chip (SoC), or a system large scale integration (LSI).

The processor 32 may include a dedicated processor for each of the functions F1 to F3. The memory 33 may include a dedicated memory for each of the functions F1 to F3. The processing circuit 34 may include a dedicated processing circuit for each of the functions F1 to F3.

Figures 6, 7:
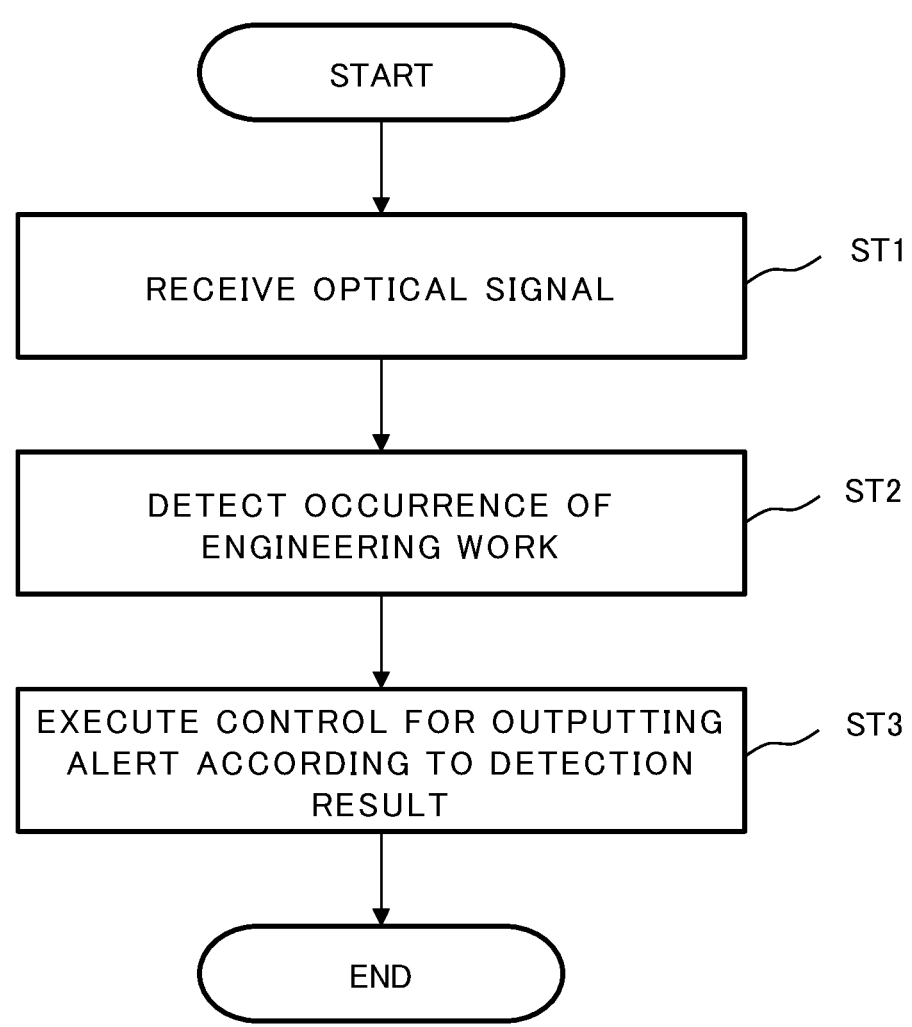
FIG. 6 is a flowchart illustrating an operation of the engineering work detection device according to the second example embodiment.
FIG. 7 is an explanatory diagram illustrating an example of utility pole information to be used by an engineering work detection unit.

Next, with reference to the flowchart illustrated in FIG. 6, an operation of the engineering work detection device 5 is described.

First, the optical signal reception unit 11 receives the optical signal from the optical fiber cable 2 (Step ST1). Subsequently, the engineering work detection unit 12 detects occurrence of the engineering work in the periphery of each of the utility poles 1 using the received optical signal (Step ST2). Subsequently, the output control unit 13 executes control for outputting the alert according to the detection result (Step ST3). Specifically, when "presence" of occurrence of the engineering work is detected in Step ST2, the output control unit 13 executes control for outputting the alert.

Figure 8A:
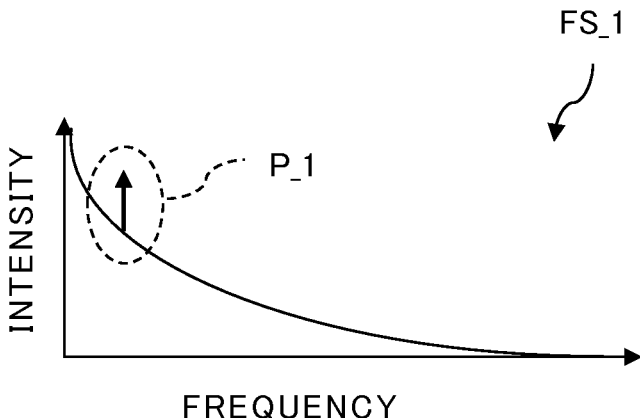
FIG. 8A is an explanatory diagram illustrating an example of a frequency spectrum associated with a vibration pattern of a utility pole when an engineering work does not occur in a periphery.
Figure 8B:
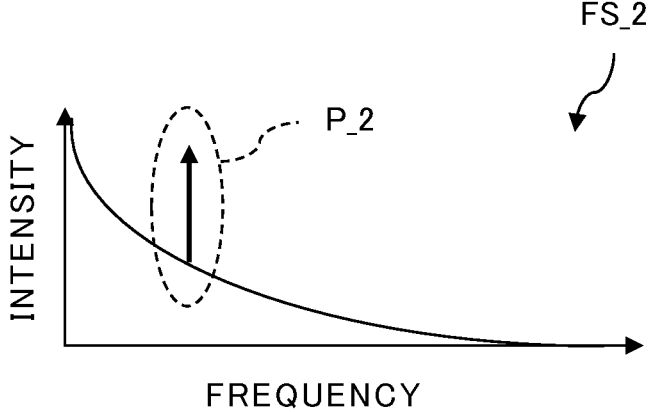
FIG. 8B is an explanatory diagram illustrating an example of a frequency spectrum associated with a vibration pattern of a utility pole when an engineering work occurs in a periphery.

Next, with reference to FIG. 7, FIG. 8A, and FIG. 8B, a first specific example of the detection method performed by the engineering work detection unit 12 is described.

First, the optical communication device 3 outputs a pulsed optical signal. The optical signal being output is input to the optical fiber cable 2 via the filter unit 4. When the optical signal is input, back scattered light is generated inside the optical fiber cable 2. As described above, the optical signal received by the optical signal reception unit 11 is acquired after separation performed by the filter unit 4, and contains the component associated with the back scattered light being generated (hereinafter, referred to as "back scattered light component").

In this state, the optical signal received by the optical signal reception unit 11 contains the component associated with the back scattered light generated at a position of the optical fiber cable 2 that is associated with each of the utility poles 1. In other words, the optical signal being received contains the back scattered light component associated with each of the utility poles 1. Timing at which the back scattered light component is received differs according to a distance D between a position at which the associated utility pole 1 is installed and a position at which the engineering work detection device 5 is installed (more specifically, a position at which the receiver 31 is installed). Herein, the distance D is a path distance along the optical fiber cable 2.

Herein, the back scattered light component contained in the optical signal received by the optical signal reception unit 11 indicates a different pattern according to vibration of the associated utility pole 1 (hereinafter, referred to as a "vibration pattern"). In other words, the optical signal being received contains the vibration pattern associated with each of the utility poles 1. The engineering work detection unit 12 detects occurrence of the engineering work, based on the vibration pattern.

Specifically, when an engineering work does not occur in the periphery of each of the utility poles 1, environment vibration in the periphery is transmitted to the utility pole 1 via the ground. In contrast, when an engineering work occurs in the periphery of each of the utility poles 1, vibration generated by the engineering work (for example, vibration generated by an operation of construction machinery) is transmitted to the utility pole 1 via the ground. Thus, for each of the utility poles 1, the vibration pattern in a case where the engineering work occurs in the periphery changes with respect to the vibration pattern in a case where the engineering work does not occur in the periphery. Specifically, for example, an attenuation time T of a time waveform TW indicating the vibration pattern changes. Alternatively, for example, a peak frequency of a frequency spectrum FS indicating the vibration pattern changes. Thus, occurrence of the engineering work in the periphery of each of the utility poles 1 can be detected based on the vibration pattern.

The engineering work detection device 5 (more specifically, the memory 33 or a storage area of the processing circuit 34) stores information relating to each of the utility poles 1 (hereinafter, referred to as "utility pole information"). The utility pole information includes information indicating the distanced D associated with each of the utility poles 1 (hereinafter, referred to as "distance information"). Further, the utility pole information includes information for identifying each of the utility poles 1 (hereinafter, referred to as "identification information"). For example, the identification information includes an identifier allocated to each of the utility pole 1. FIG. 7 illustrates an example of the utility pole information.

The engineering work detection device 5 acquires information indicating timing at which the optical communication device 3 outputs a pulsed optical signal. The information is acquired from the optical communication device 3, for example. The engineering work detection unit 12 calculates a time difference between the timing indicated in the acquired information and the timing at which the optical signal reception unit 11 receives the back scattered light component. The engineering work detection unit 12 calculates a distance D' between the position at which the back scattered light component is generated and the position at which the receiver 31 is installed based on the calculated time difference. Herein, the distance D' is a path distance along the optical fiber cable 2.

The engineering work detection unit 12 compares the distance D' being calculated with each of the distances D indicated in the distance information included in the utility pole information. With this, the engineering work detection unit 12 detects the back scattered light component associated with each of the utility poles 1 from the back scattered light components contained in the optical signals being received. As a result, the vibration pattern associated with each of the utility poles 1 is detected. More specifically, the time waveform TW indicating the vibration pattern associated with each of the utility poles 1 is detected.

Subsequently, the engineering work detection unit 12 executes fast Fourier transform (FFT) for the time waveform being detected. With this, a frequency spectrum FS indicating the vibration pattern associated with each of the utility poles 1 is calculated.

FIG. 8A illustrates an exemplary image of a frequency spectrum FS_1 indicating a vibration pattern associated with the utility pole 1 without occurrence of the engineering work in the periphery. In contrast, FIG. 8B illustrates an exemplary image of a frequency spectrum F5_2 indicating a vibration pattern associated with the utility pole 1 with occurrence of the engineering work in the periphery. P_1 in FIG. 8A indicates a peak of the frequency spectrum FS_1. P_2 in FIG. 8B indicates a peak of the frequency spectrum FS_2.

As described above, the peak frequency of the frequency spectrum FS changes due to occurrence of the engineering work in the periphery of the associated utility pole 1. In the examples illustrated in FIG. 8A and FIG. 8B, the peak frequency of the frequency spectrum FS_2 (see FIG. 8B) has a value different from the peak frequency of the frequency spectrum FS_1 (see FIG. 8A).

A reference value to be compared with the peak frequency is set in the engineering work detection unit 12. The reference value is set to be a value equivalent to the peak frequency of the frequency spectrum FS indicating the vibration pattern associated with the utility pole 1 without occurrence of the engineering work in the periphery. Specifically, for example, the reference value is set to a value equivalent to the peak frequency of the frequency spectrum FS_1 illustrated in FIG. 8A.

The engineering work detection unit 12 detects the peak frequency of the frequency spectrum FS that is calculated as described above. The engineering work detection unit 12 compares the peak frequency being detected with the reference value that is set as described above. With this, the engineering work detection unit 12 determines presence or absence of occurrence of the engineering work in the periphery of the associated utility pole 1. In this manner, occurrence of the engineering work in the periphery of each of the utility poles 1 is detected.

Further, the engineering work detection device 5 (more specifically, the memory 33 or a storage area of the processing circuit 34) stores information indicating an area including a position at which each of the utility poles 1 is installed. By using the stored information, the engineering work detection unit 12 detects an area including a position at which the utility pole 1 is installed, the utility pole 1 being determined to have occurrence of the engineering work in the periphery. In this manner, the area in which the engineering work occurs is detected.

Figure 9A:
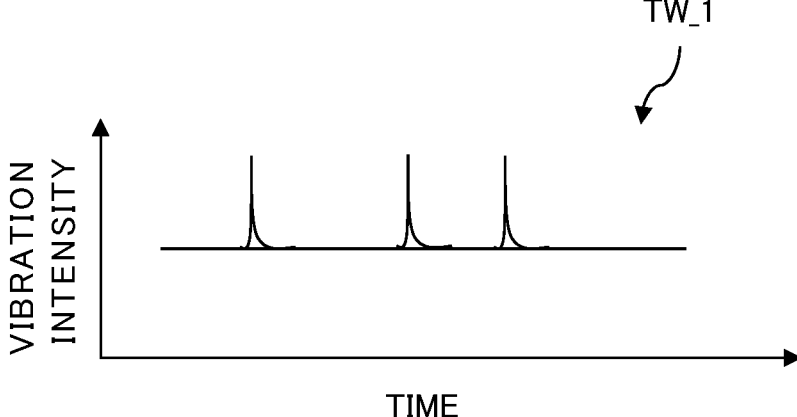
FIG. 9A is an explanatory diagram illustrating an example of a time waveform associated with a vibration pattern of a utility pole when an engineering work does not occur in a periphery.
Figure 9B:
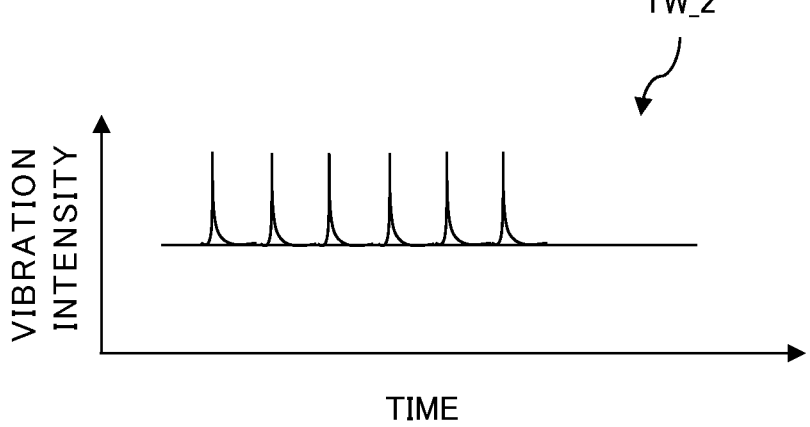
FIG. 9B is an explanatory diagram illustrating an example of a time waveform associated with a vibration pattern of a utility pole when an engineering work occurs in a periphery.

Next, with reference to FIG. 9A and FIG. 9B, a second specific example of the detection method performed by the engineering work detection unit 12 is described.

The engineering work detection unit 12 detects the back scattered light component associated with each of the utility poles 1, by a detection method similar to the detection method described in the first specific example. As a result, the vibration pattern associated with each of the utility poles 1 is detected. More specifically, the time waveform TW indicating the vibration pattern associated with each of the utility poles 1 is detected.

In general, the time waveform TW associated with the vibration pattern without occurrence of the engineering work in the periphery includes a pulsed waveform that is generated in a non-periodic manner. This is due to environment vibration. FIG. 9A illustrates an example of a time waveform TW_1 indicating the vibration pattern associated with the utility pole 1 without occurrence of the engineering work in the periphery.

In contrast, the time waveform TW associated with the vibration pattern with occurrence of the engineering work in the periphery includes a pulsed waveform that is generated in a periodic manner. For example, this is due to vibration generated by an operation of construction machinery. FIG. 9B illustrates an example of the time waveform TW_2 indicating the vibration pattern associated with the utility pole 1 with occurrence of the engineering work in the periphery.

In view of this, the engineering work detection unit 12 determines whether the pulsed waveform that is generated in a periodic manner is included, by analyzing the above-mentioned time waveform TW detected above. When the pulsed waveform is included, the engineering work detection unit 12 determines that the engineering work occurs in the periphery of the associated utility pole 1. Otherwise, the engineering work detection unit 12 determines that the engineering work does not occur in the periphery of the associated utility pole 1. In this manner, occurrence of the engineering work in the periphery of each of the utility poles 1 is detected.

Subsequently, the engineering work detection unit 12 detects the area in which the engineering work occurs. The area detection method is similar to that described in the first specific example. Thus, repetitive description is omitted.

Figure 10:
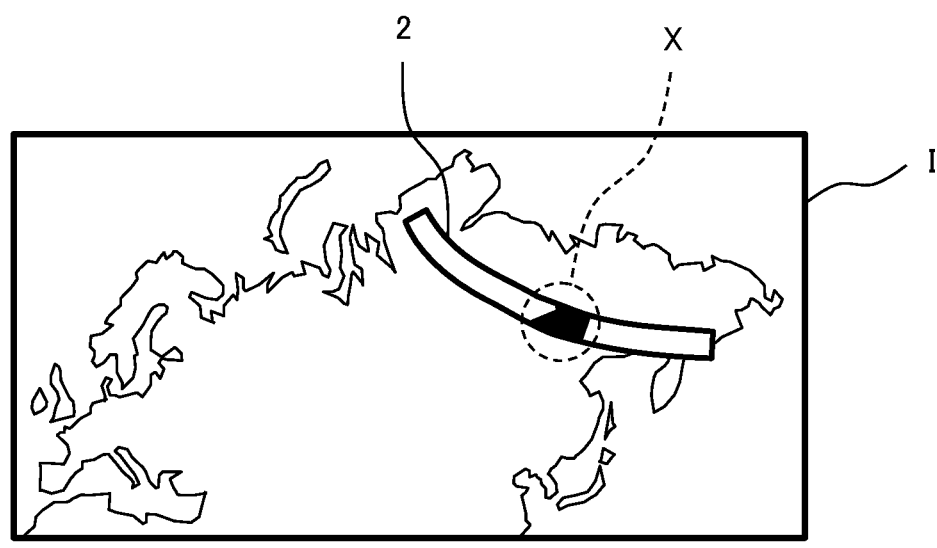
FIG. 10 is an explanatory diagram illustrating an example of an image used for an alert.

Next, with reference to FIG. 10, a first specific example of the alert image is described.

FIG. 10 illustrates an example of an alert image I. As illustrated in FIG. 10, the image I may include a map-like image indicating a regional area in which the optical fiber cable 2 is provided. Further, in the image I, a color of a part (X in the figure) of the optical fiber cable 2, which is associated with the utility pole 1 with occurrence of the engineering work in the periphery, is indicated as a color different from a color of the other parts. With this, a user of the engineering work detection system 100 can visually recognize the location where the engineering work occurs in the regional area.

Next, effects exerted by using the engineering work detection system 100 are described.

Firstly, as described above, occurrence of the engineering work in the periphery of each of the utility poles 1 is detected. In this case, the so-called "remote" detection can be achieved. Specifically, at the time of detecting occurrence of the engineering work in the periphery of each of the utility poles 1, patrol of a worker is not required. Further, regardless of a notification, occurrence of the engineering work can be detected.

Secondly, when occurrence of the engineering work in the periphery of each of the utility poles 1 is detected, an existing optical fiber cable 2 (for example, the optical fiber cable 2 for OPGW) can be used. With this, an optical fiber cable dedicated for detecting occurrence of the engineering work is not required. As a result, a work for installing the optical fiber cable is not required.

Thirdly, as compared to the technique described in PTL 1, the configuration can be simplified. Specifically, it is assumed that the technique described in PTL 1 is used for detection of occurrence of the engineering work in the periphery of each of the utility poles 1. In this case, it is required to install a vibration sensor under the ground along a power transmission network or a power distribution network including the utility poles 1_1 to 1_N. In contrast, when the engineering work detection system 100 is used, the vibration sensor is not required. Thus, a work for installing the vibration sensor (that is, a large-scale installation work in advance) is not required, either. Next, a modification example of the engineering work detection system 100 is described.

In the example illustrated in FIG. 1 and FIG. 2, the optical communication device 3, the filter unit 4, and the engineering work detection device 5 are provided at one end of the optical fiber cable 2.

In contrast, the optical communication device 3, the filter unit 4, and the engineering work detection device 5 may be provided at each of both the ends of the optical fiber cable 2. Next, another modification example of the engineering work detection system 100 is described.

The engineering work detection system 100 may use a plurality of optical fiber cables (not depicted) in place of one optical fiber cable 2. For example, the plurality of optical fiber cables are provided along paths different from each other in a power transmission network or a power distribution network including the utility poles 1_1 to 1_N. In this case, the optical signal reception unit 11 receives the optical signal from each of the plurality of optical fiber cables. The engineering work detection unit 12 subjects each of the plurality of optical fiber cables to the processing similar to the processing described in the first specific example or the second specific example. With this, occurrence of the engineering work in the periphery of each of the utility poles 1_1 to 1_N is detected.

Next, another modification example of the engineering work detection system 100 is described.

The engineering work detection device 5 may acquire information indicating a notification of an engineering work to a municipal authority (hereinafter, referred to as "notification information"). For example, the notification information includes a location where an individual engineering work is scheduled to occur and a date when an individual engineering work is scheduled to occur.

When the engineering work detection unit 12 detects occurrence of the engineering work, the engineering work detection device 5 may determine whether the engineering work is included in the notification information. With this, the engineering work detection device 5 may determine whether the engineering work is an unauthorized engineering work. In other words, the engineering work detection device 5 may detect occurrence of an unauthorized engineering work.

Next, another modification example of the engineering work detection system 100 is described with reference to FIG. 11.

Figure 11:
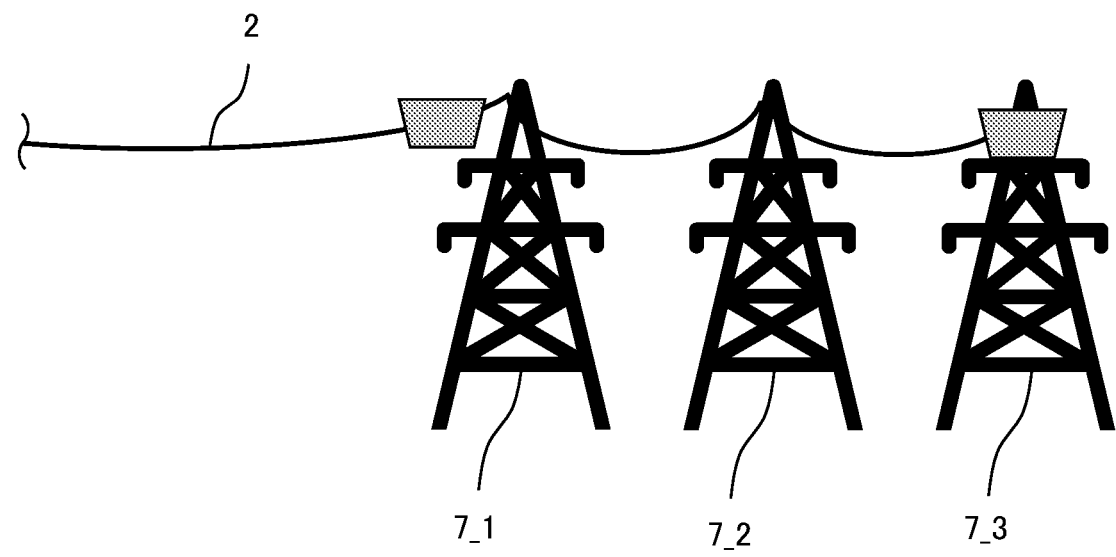
FIG. 11 is an explanatory diagram illustrating an installation example of an optical fiber cable provided overhead via a plurality of towers.

As illustrated in FIG. 11, the optical fiber cable 2 may be provided overhead via M towers 7_1 to 7_M. Herein, M is an integer equal to or greater than 2. In the example illustrated in FIG. 11, M=3 is satisfied. The towers 7_1 to 7_M are included in a power transmission network or a power distribution network. In other words, the towers 7_1 to 7_M are for power transmission or power distribution.

In this case, the engineering work detection unit 12 detects occurrence of the engineering work in the periphery of each of the towers 7. In this case, the detection method performed by the engineering work detection unit 12 is similar to that described in the first specific example or the second specific example. Thus, repetitive description is omitted.

Next, another modification example of the engineering work detection system 100 is described with reference to FIG. 12.

Figure 12:
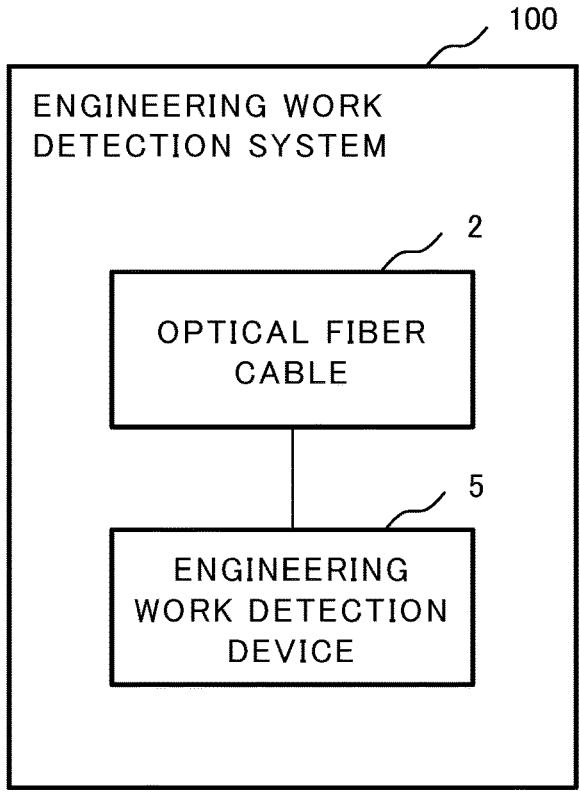
FIG. 12 is a block diagram illustrating main parts of another engineering work detection system according to the second example embodiment.

As illustrated in FIG. 12, the engineering work detection system 100 may include the optical fiber cable 2 and the engineering work detection device 5. In other words, the main parts of the engineering work detection system 100 may be configured by the optical fiber cable 2 and the engineering work detection device 5. In this case, the engineering work detection device 5 may include a function of outputting the pulsed optical signal to the optical fiber cable 2. Next, a modification example of the engineering work detection device 5 is described with reference to FIG. 13.

Figure 13:
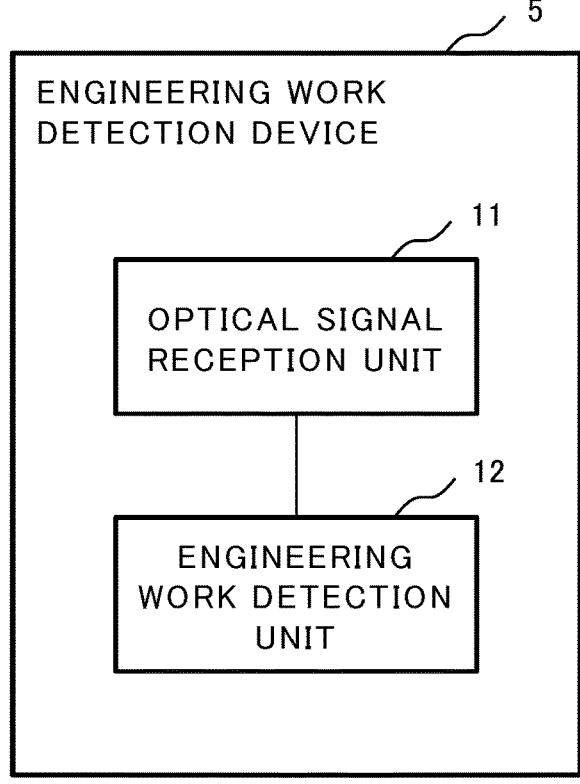
FIG. 13 is a block diagram illustrating the main parts of the another engineering work detection system according to the second example embodiment.

As illustrated in FIG. 13, the engineering work detection device 5 may include the optical signal reception unit 11 and the engineering work detection unit 12. In other words, the main parts of the engineering work detection device 5 may be configured by the optical signal reception unit 11 and the engineering work detection unit 12. In this case, the output control unit 13 may be provided to the output device 6. In this case, the effects described above can be exerted.

Specifically, the optical signal reception unit 11 receives the optical signal from the optical fiber cable 2 provided overhead via the utility pole 1 or the tower 7. The engineering work detection unit 12 detects occurrence of the engineering work in the periphery of the utility pole 1 or the tower 7, based on the vibration pattern of the utility pole 1 or the tower 7 that is indicated by the optical signal. With this, occurrence of the engineering work in the periphery of each of the utility poles 1 or each of the towers 7 can be detected. In particular, occurrence of the engineering work can be detected remotely. Further, the vibration sensor used in the technique described in PTL 1 is not required, and hence occurrence of the engineering work can be detected with a simple configuration.

Third Example Embodiment

Figure 14:
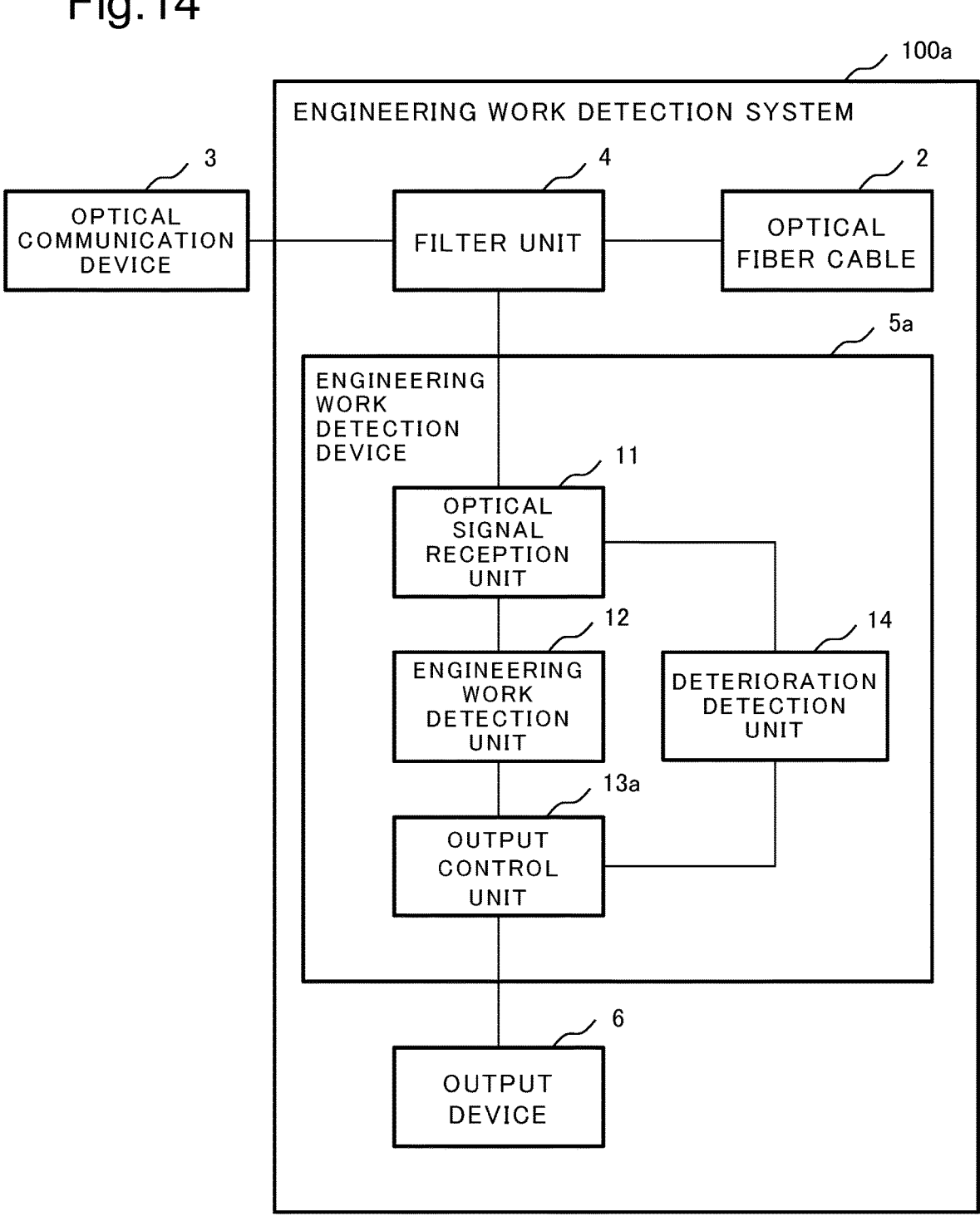
FIG. 14 is a block diagram illustrating main parts of an engineering work detection system according to a third example embodiment.

FIG. 14 is a block diagram illustrating main parts of an engineering work detection system according to a third example embodiment. With reference to FIG. 14, the engineering work detection system according to the third example embodiment is described. In FIG. 14, the blocks similar to the blocks illustrated in FIG. 2 are denoted with the same reference symbols, and the description therefor is omitted.

As illustrated in FIG. 14, an engineering work detection system 100*a* includes the optical fiber cable 2, the filter unit 4, an engineering work detection device 5*a*, and the output device 6. The engineering work detection device 5*a* includes the optical signal reception unit 11, the engineering work detection unit 12, an output control unit 13*a*, and a deterioration detection unit 14.

The deterioration detection unit 14 detects deterioration at a part associated with a predetermined location in the optical fiber cable 2 (hereinafter, referred to as a "deterioration detection target part"), by using the optical signal that is received by the optical signal reception unit 11. More specifically, the deterioration detection unit 14 detects presence or absence of the deterioration at the deterioration detection target part, and also detects a degree of the deterioration at the deterioration detection target part. Alternatively, the deterioration detection unit 14 detects an indication of the deterioration at the deterioration detection target part. Specific examples of the detection method performed by the deterioration detection unit 14 are described later with reference to FIG. 16A to FIG. 20D.

The output control unit 13*a* executes control similar to control executed by the output control unit 13. Specifically, when the engineering work detection unit 12 detects occurrence of the engineering work, the output control unit 13*a* executes control for outputting the alert.

In addition to this, the output control unit 13*a* executes control for outputting information indicating a result of the detection performed by the deterioration detection unit 14 (hereinafter, referred to as "detection result information"). The detection result information is output by using the output device 6. Specifically, the output control unit 13*a* executes control for displaying an image including the detection result information. The image is displayed by using the display device in the output device 6. Alternatively, the output control unit 13*a* executes control for outputting a sound associated with the detection result information. The sound is output by using the sound output device in the output device 6. Alternatively, the output control unit 13*a* executes control for transmitting a signal associated with the detection result information. The signal is transmitted by using the communication device in the output device 6.

In this manner, the main parts of the engineering work detection system 100*a* are configured.

Hereinafter, the output control unit 13*a* is referred to as an "output control means" in some cases. Further, the deterioration detection unit 14 is referred to as a "deterioration detection means" in some cases.

A hardware configuration of the main parts of the engineering work detection device 5*a* is similar to that described with reference to FIG. 3 to FIG. 5 in the second example embodiment. Thus, detailed description therefor is omitted.

Specifically, the function F1 of the optical signal reception unit 11, the function F2 of the engineering work detection unit 12, a function F3a of the output control unit 13a, and the function F4 of the deterioration detection unit 14 may be achieved by the processor 32 and the memory 33. Alternatively, the functions F1, F2, F3a, and F4 may be achieved by the processing circuit 34.

Herein, the processor 32 may include a dedicated processor for each of the functions F1, F2, F3a, and F4. The memory 33 may include a dedicated memory for each of the functions F1, F2, F3a, and F4. The processing circuit 34 may include a dedicated processing circuit for each of the functions F1, F2, F3a, and F4.

Figure 15:
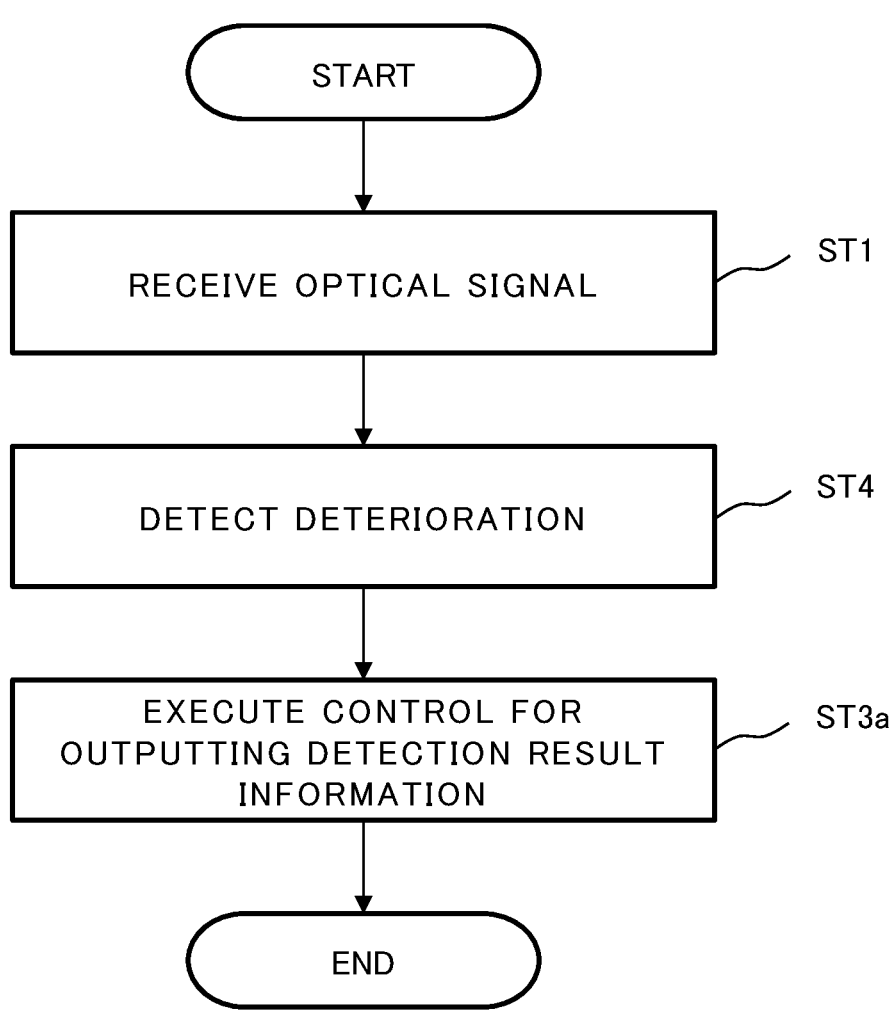
FIG. 15 is a flowchart illustrating an operation of an engineering work detection device according to the third example embodiment.

Next, with reference to the flowchart illustrated in FIG. 15, an operation of the engineering work detection device 5a is described, mainly focusing on operations of the optical signal reception unit 11, the output control unit 13a, and the deterioration detection unit 14. In FIG. 15, the steps similar to the steps in FIG. 6 are denoted with the same reference symbols.

First, the optical signal reception unit 11 receives the optical signal from the optical fiber cable 2 (Step ST1). Subsequently, the deterioration detection unit 14 detects deterioration of the optical fiber cable 2 by using the received optical signal (Step ST4). More specifically, the deterioration detection unit 14 detects deterioration at the deterioration detection target part of the optical fiber cable 2. Subsequently, the output control unit 13a executes control for outputting the information indicating a result of the detection (in other words, the detection result information) (Step ST3a).

For example, it is assumed that, in Step ST4, "absence" of deterioration is detected. In this case, in Step ST3a, the detection result information indicating "absence" of deterioration is output. In contrast, for example, it is assumed that, in Step ST4, "presence" of deterioration is detected and the degree of the deterioration is detected. In this case, in Step ST3a, the detection result information indicating "presence" of occurrence of deterioration and the degree of the deterioration (for example, any value of two-stage values) is output.

Figures 16A, 16B:
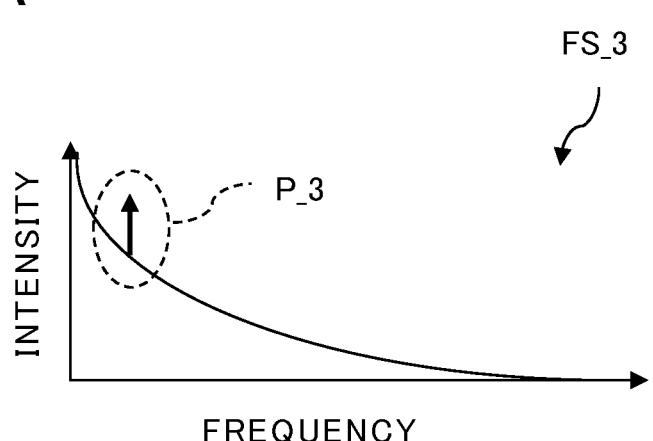
FIG. 16A is an explanatory diagram illustrating an example of a frequency spectrum associated with a vibration pattern when an optical fiber cable is not deteriorated.
FIG. 16B is an explanatory diagram illustrating an example of a frequency spectrum associated with a vibration pattern when an optical fiber cable is deteriorated.

With reference to FIG. 16A and FIG. 16B, a first specific example of the detection method performed by the deterioration detection unit 14 is described. In the first specific example, the deterioration detection unit 14 detects presence or absence of the deterioration at the deterioration detection target part, and also detects the degree of the deterioration.

The engineering work detection device 5a (more specifically, the memory 33 or a storage area of the processing circuit 34) stores information indicating the distance D associated with the deterioration detection target part. Using the information, the deterioration detection unit 14 detects the back scattered light component associated with the deterioration detection target part from the back scattered light component included in the optical signal that is received by the optical signal reception unit 11. Subsequently, the deterioration detection unit 14 detects characteristics included in the back scattered light component being detected. More specifically, the deterioration detection unit 14 detects the vibration pattern included in the back scattered light component being detected. Deterioration is detected by the deterioration detection unit 14, based on such characteristics.

Specifically, deterioration at the deterioration detection target part occurs, and thus optical characteristics of the deterioration detection target part change. With this, characteristics of the associated back scattered light component change. Specifically, for example, the attenuation time T of the time waveform TW indicating the vibration pattern changes. Further, for example, the peak frequency of the frequency spectrum FS indicating the vibration pattern changes. Thus, deterioration at the deterioration detection target part can be detected based on the vibration pattern.

Further, in this case, a change amount of the vibration pattern (for example, a change amount of the attenuation time T or a change amount of the peak frequency) differs according to a degree of deterioration. More specifically, as the degree of deterioration is higher, the change amount is a greater value. Thus, based on the vibration pattern, the degree of the deterioration at the deterioration detection target part can be detected.

The deterioration detection unit 14 executes fast Fourier transform (FFT) for the time waveform TW indicating the vibration pattern being detected. With this, the frequency spectrum FS indicating the vibration pattern associated with the deterioration detection target part is calculated.

FIG. 16A illustrates an exemplary image of a frequency spectrum FS_3 indicating a vibration pattern when deterioration of the optical fiber cable 2 (more specifically, the deterioration detection target part) does not occur. In contrast, FIG. 16B illustrates an exemplary image of a frequency spectrum FS_4 indicating a vibration pattern when such deterioration occurs. P_3 in FIG. 16A indicates a peak of the frequency spectrum FS_3. P_4 in FIG. 16B indicates a peak of the frequency spectrum FS_4.

As described above, when deterioration at the deterioration detection target part occurs, the peak frequency of the frequency spectrum FS changes. In the examples illustrated in FIG. 16A and FIG. 16B, the peak frequency of the frequency spectrum FS_4 (see FIG. 16B) is a value different from the peak frequency of the frequency spectrum FS_3 (see FIG. 16A).

A reference value to be compared with the peak frequency is set in the deterioration detection unit 14. The reference value is set to be a value equivalent to the peak frequency of the frequency spectrum FS indicating the vibration pattern when deterioration at the deterioration detection target part does not occur. Specifically, for example, the reference value is set to a value equivalent to the peak frequency of the frequency spectrum FS_3 illustrated in FIG. 16A.

The deterioration detection unit 14 detects the peak frequency of the frequency spectrum FS that is calculated as described above. The deterioration detection unit 14 compares the peak frequency being detected with the reference value that is set as described above. With this, deterioration detection unit 14 determines presence or absence of the deterioration at the deterioration detection target part. In this manner, presence or absence of the deterioration at the deterioration detection target part is detected.

Further, as described above, according to the degree of the deterioration at the deterioration detection target part, a change amount of the peak frequency of the frequency spectrum FS being associated therewith differs. In view of this, the engineering work detection device 5a (more specifically, the memory 33 or a storage area of the processing circuit 34) stores information indicating a correlation between a value indicating a degree of deterioration (for example, a two-stage value) and a value indicating a change amount of the peak frequency. The deterioration detection unit 14 calculates a change amount of the peak frequency being detected as described above with respect to the reference value being set as described above. The deterioration detection unit 14 determines a degree of deterioration associated with the change amount being calculated, by using the information being stored. With this, the degree of the deterioration at the deterioration detection target part is detected.

Figure 17A:
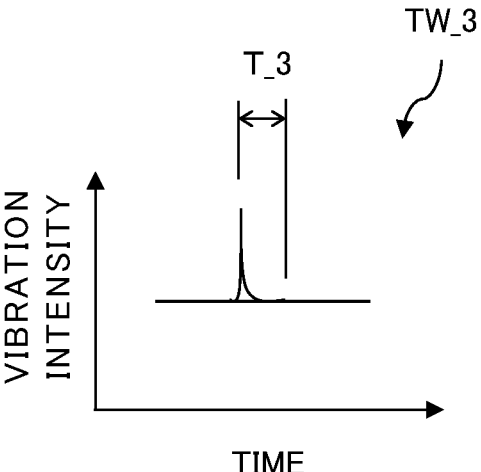
FIG. 17A is an explanatory diagram illustrating an example of a time waveform associated with a vibration pattern when an optical fiber cable is not deteriorated.
Figure 17B:
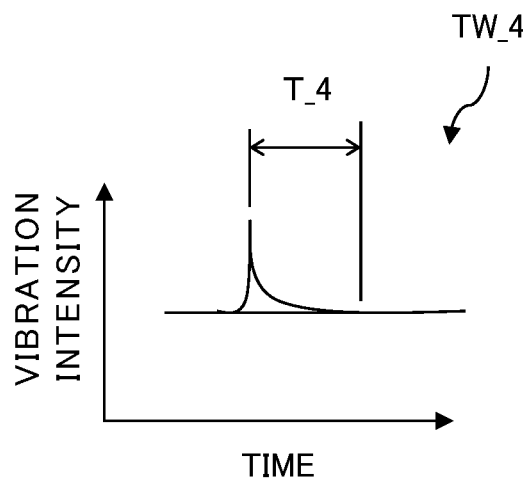
FIG. 17B is an explanatory diagram illustrating an example of a time waveform associated with a vibration pattern when an optical fiber cable is deteriorated.

Next, with reference to FIG. 17A and FIG. 17B, a second specific example of the detection method performed by the deterioration detection unit 14 is described. In the second specific example, the deterioration detection unit 14 detects presence or absence of the deterioration at the deterioration detection target part, and also detects the degree of the deterioration.

The deterioration detection unit 14 detects characteristics included in the back scattered light component associated with the deterioration detection target part, by a detection method similar to the detection method described in the first specific example. More specifically, the deterioration detection unit 14 detects the vibration pattern included in the back scattered light component.

Herein, when the time waveform TW associated with the vibration pattern being detected includes a pulsed waveform, the attenuation time T of the pulse becomes a different value according to presence or absence of the deterioration at the deterioration detection target part. Further, a change amount of the attenuation time T of the pulse becomes a different value according to the degree of the deterioration. This is as described in the first specific example.

FIG. 17A illustrates an exemplary image of a time waveform TW_3 indicating a vibration pattern when deterioration of the optical fiber cable 2 (more specifically, the deterioration detection target part) does not occur. In contrast, FIG. 17B illustrates an exemplary image of a time waveform TW_4 indicating a vibration pattern when such deterioration occurs. T_3 in FIG. 17A indicates an attenuation time of the pulse in the time waveform TW_3. T_4 in FIG. 17B indicates an attenuation time of the pulse in the time waveform TW_4.

A reference value to be compared with the attenuation time T is set in the deterioration detection unit 14. The reference value is set to be a value equivalent to the attenuation time T in the time waveform TW indicating the vibration pattern when deterioration at the deterioration detection target part does not occur. Specifically, for example, the reference value is set to a value equivalent to the attenuation time T_3 in the time waveform TW_3 illustrated in FIG. 17A.

When the time waveform TW associated with the vibration pattern being detected includes a pulsed waveform, the deterioration detection unit 14 calculates the attenuation time T of the pulse. The deterioration detection unit 14 compares the attenuation time T being calculated with the reference value that is set as described above. With this, deterioration detection unit 14 detects presence or absence of the deterioration at the deterioration detection target part.

Further, the engineering work detection device 5a (more specifically, the memory 33 or a storage area of the processing circuit 34) stores information indicating a correlation between a value indicating a degree of deterioration (for example, a two-stage value) and a value indicating a change amount of the attenuation time T. The deterioration detection unit 14 calculates a change amount of the attenuation time T being calculated as described above with respect to the reference value being set as described above. The deterioration detection unit 14 determines a degree of deterioration associated with the change amount being calculated, by using the information being stored. With this, the degree of the deterioration at the deterioration detection target part is detected.

Figure 19:
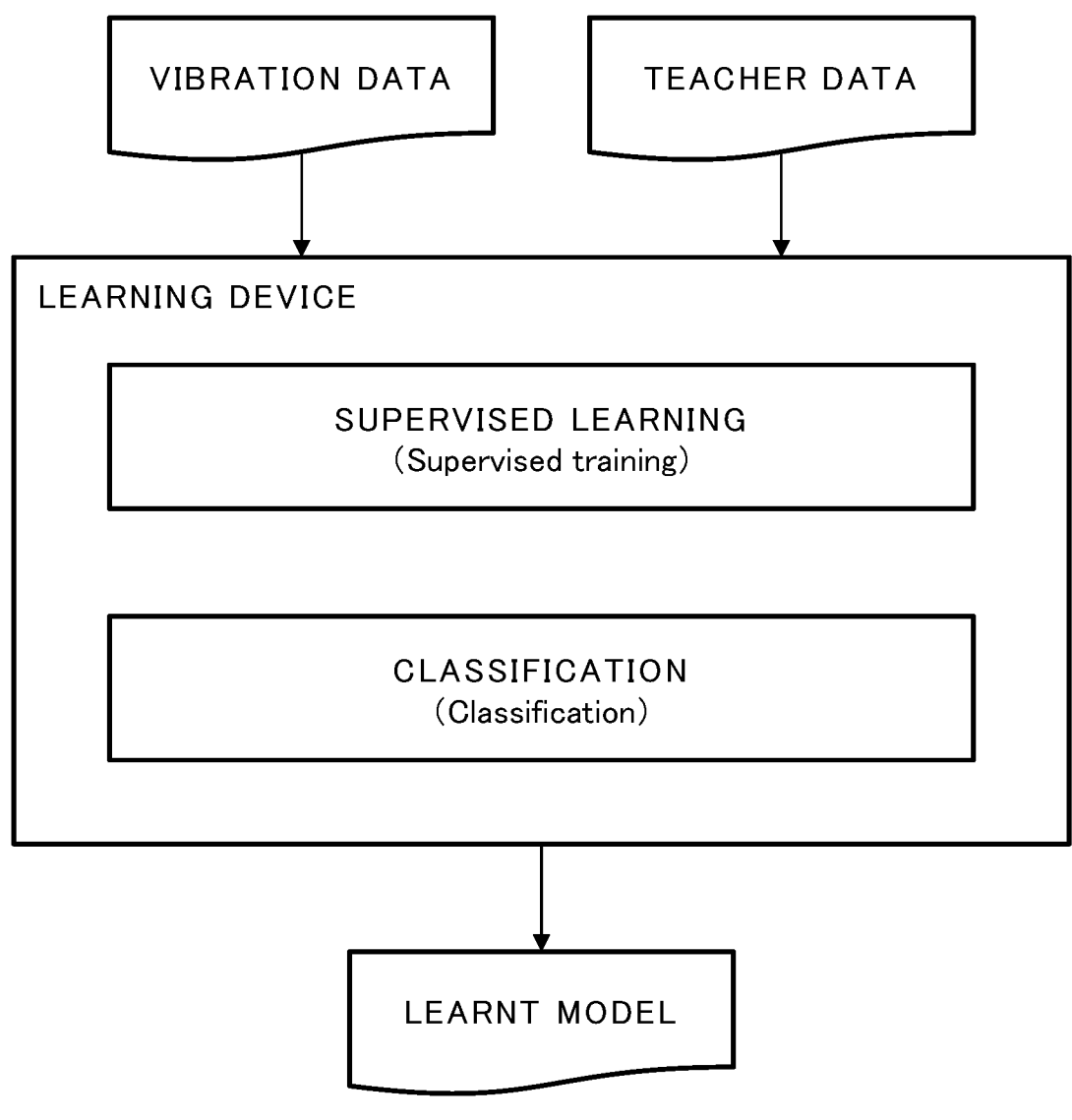
FIG. 19 is an explanatory diagram illustrating an example of a learner to be used for machine learning.

Next, with reference to FIG. 18 and FIG. 19, a third specific example of the detection method performed by the deterioration detection unit 14 is described. In the third specific example, the deterioration detection unit 14 detects presence or absence of the deterioration at the deterioration detection target part, and also detects the degree of the deterioration.

In the third specific example, a learnt model generated by machine learning is used. More specifically, in the third specific example, a learnt model generated by supervised learning is used. Hereinafter, the machine learning is described.

Firstly, as training input data used for the machine learning, data indicating a plurality of vibration patterns (hereinafter, referred to as "vibration data") are prepared. A vibration pattern associated with each deterioration state of the deterioration detection target part is included. Secondly, as teacher data used for the machine learning (in other words, correct data), data indicating the deterioration state associated with each of the vibration patterns included in the vibration data is prepared. FIG. 18 illustrates an example of those data (initial training data).

A plurality of vibration data among the initial training data illustrated in FIG. 18 are input to the dedicated learning device (see FIG. 19). The learning device generates the learnt model by executing the machine learning using those vibration data as the training input data. For example, the learning device receives the training input data indicating each of the vibration patterns. The learning device executes the machine learning for the training input data, and repeats the learning processing until correct data are acquired at a predetermined accuracy. As a result, the learnt pattern associated with the deterioration detection target part is generated. Subsequently, the learning device uses input data being new vibration data as input data relating to the learnt pattern, and performs classification for presence or absence of deterioration and a degree of deterioration at the deterioration detection target part. As a result, the learning device outputs information indicating presence or absence of deterioration and a degree of deterioration at the deterioration detection target part. FIG. 19 illustrates an example of the learning processing and the classification processing of the machine learning of the learning device. In this manner, the learnt model is generated.

For the machine learning of the learning device, various publicly known techniques, for example, a support vector machine (SVM) or a neural network may be used. Details of those techniques are omitted in the description.

The deterioration detection unit 14 detects the vibration pattern associated with the deterioration detection target part by using the optical signal that is received by the optical signal reception unit 11 (see the first specific example). The deterioration detection unit 14 generates the data indicating the vibration pattern being detected. Herein, the deterioration detection unit 14 includes the learnt model being generated as described above. The deterioration detection unit 14 inputs the data being generated to the learnt model. Then, the learnt model outputs the information indicating presence or absence of the deterioration and the degree of the deterioration at the deterioration detection target part. With this, presence or absence of deterioration at the deterioration detection target part is detected, and the degree of the deterioration is also detected.

Next, with reference to FIG. 20A to FIG. 20D, a fourth specific example of the detection method performed by the deterioration detection unit 14 is described. In the fourth specific example, the deterioration detection unit 14 detects the indication of the deterioration at the deterioration detection target part.

Figure 20A:
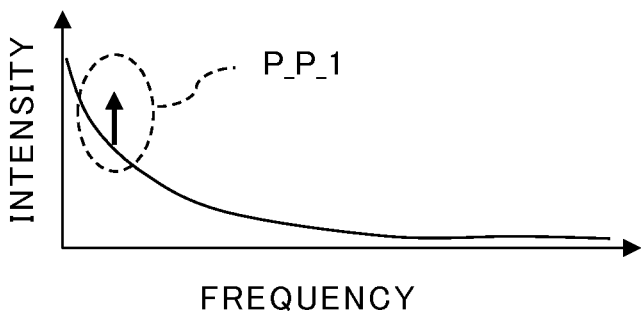
FIG. 20A is an explanatory diagram illustrating an example of a frequency spectrum associated with a vibration pattern at a past time point.
Figure 20B:
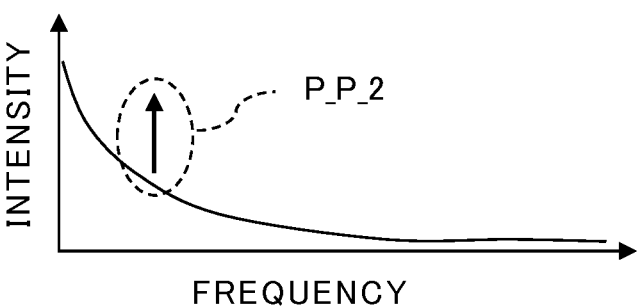
FIG. 20B is an explanatory diagram illustrating an example of a frequency spectrum associated with a vibration pattern at another past time point.
Figure 20C:
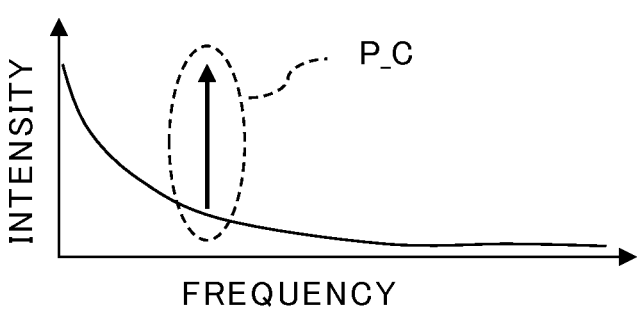
FIG. 20C is an explanatory diagram illustrating an example of a frequency spectrum associated with a vibration pattern at a current time point.

The deterioration detection unit 14 regularly executes detection of the peak frequency as in the first specific example. With this, for example, it is assumed that peak frequencies at a plurality of past time points and a peak frequency at a current time point are detected. FIG. 20A illustrates an example of a frequency spectrum at a past time point (for example, two years ago). FIG. 20B illustrates an example of a frequency spectrum at a past time point (for example, a year ago). FIG. 20C illustrates an example of a frequency spectrum at a current time point (for example, the current year). P_P_1 in FIG. 20A indicates a peak of the frequency spectrum. P_P_2 in FIG. 20B indicates a peak of the frequency spectrum. P_C in FIG. 20C indicates a peak of the frequency spectrum.

Figure 20D:
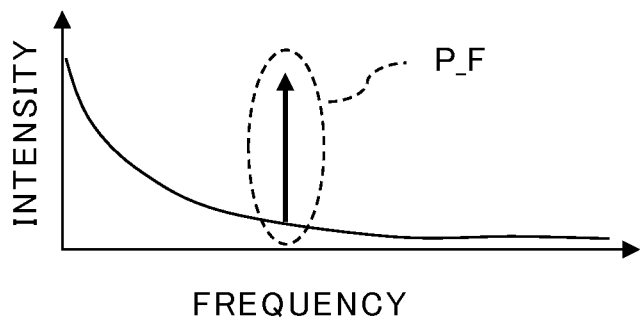
FIG. 20D is an explanatory diagram illustrating an example of a frequency spectrum associated with a vibration pattern at a future time point.

The deterioration detection unit 14 predicts a peak frequency at a future time point, based on those peak frequencies. For example, a least-squares method is used for the prediction. FIG. 20D illustrates an example of a frequency spectrum at a future time point (for example, next year). P_F in FIG. 20D indicates a peak of the frequency spectrum. The deterioration detection unit 14 compares the peak frequency being predicted with a reference value similar to the reference value in the first specific example. With this, for the deterioration detection target part, the deterioration detection unit 14 predicts presence or absence of deterioration at a future time point, and predicts a degree of deterioration at a future time point.

For example, it is assumed that deterioration at a future time point is predicted. In this case, the deterioration detection unit 14 determines that the deterioration detection target part has an indication of deterioration. In contrast, it is assumed that deterioration at a future time point is not predicted. In this case, the deterioration detection unit 14 determines that the deterioration detection target part does not have an indication of deterioration. In this manner, an indication of deterioration at the deterioration detection target part is detected.

Next, effects exerted by using the engineering work detection system 100a are described.

As a matter of course, occurrence of the engineering work in the periphery of each of the utility poles 1 or each of the towers 7 can be detected by using the engineering work detection system 100a, and deterioration of the optical fiber cable 2 (more specifically, a deterioration detection target location) can further be detected. Specifically, deterioration at a part associated with a freely selected location in the optical fiber cable 2 can be detected. In this case, remote detection can be achieved. Further, detection can be achieved with a simple configuration as compared to the technique described in PTL 1.

Next, a modification example of the engineering work detection system 100a is described.

With regard to a plurality of deterioration detection target locations associated with distances D that are different from each other, the deterioration detection unit 14 may detect deterioration at each of the plurality of deterioration detection target locations.

Next, another modification example of the engineering work detection system 100a is described. Further, a modification example of the engineering work detection device 5a is described.

Various modification examples similar to those described in the second example embodiment may be applied to the engineering work detection system 100a. For example, similarly to the example illustrated in FIG. 12, the engineering work detection system 100a may not include the filter unit 4 and the output device 6. Specifically, the main parts of the engineering work detection system 100a may be configured by the optical fiber cable 2 and the engineering work detection device 5a.

Various modification examples similar to those described in the second example embodiment may be applied to the engineering work detection device 5a. For example, similarly to the example illustrated in FIG. 13, the engineering work detection device 5a may not include the output control unit 13a. Specifically, the main parts of the engineering work detection device 5a may be configured by the optical signal reception unit 11, the engineering work detection unit 12, and the deterioration detection unit 14.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

The whole or a part of the example embodiments described above can be described as, but not limited to, the following supplementary notes.

[Supplementary Notes]
[Supplementary Note 1]

An engineering work detection device including:

an optical signal reception means for receiving an optical signal from an optical fiber cable provided in an overhead manner via a utility pole or a tower; and an engineering work detection means for detecting occurrence of an engineering work in a periphery of the utility pole or the tower, based on a vibration pattern of the utility pole or the tower that is indicated by the optical signal.

[Supplementary Note 2]

The engineering work detection device according to Supplementary Note 1, further including:

an output control means for executing control for outputting an alert when the engineering work detection means detects occurrence of the engineering work.

[Supplementary Note 3]

The engineering work detection device according to Supplementary Note 1 or 2, wherein the engineering work detection means detects an area in which the engineering work occurs.

[Supplementary Note 4]

The engineering work detection device according to any one of Supplementary Notes 1 to 3, further including a deterioration detection means for detecting deterioration of the optical fiber cable, based on a characteristic included in the optical signal.

[Supplementary Note 5]

The engineering work detection device according to Supplementary Note 4, wherein the deterioration detection means detects presence or absence of the deterioration, and detects a degree of the deterioration.

[Supplementary Note 6]

The engineering work detection device according to Supplementary Note 4, wherein the deterioration detection means detects an indication of the deterioration.

19 20

[Supplementary Note 7]

An engineering work detection system, including:

the engineering work detection device according to any one of Supplementary Notes 1 to 6; and the optical fiber cable.

[Supplementary Note 8]

The engineering work detection system according to Supplementary Note 7, wherein the optical fiber cable is provided inside an overhead ground wire.

[Supplementary Note 9]

The engineering work detection system according to Supplementary Note 7, wherein the optical fiber cable is dedicated for communication or sensing.

[Supplementary Note 10]

An engineering work detection method including:

receiving, by an optical signal reception means, an optical signal from an optical fiber cable provided in an overhead manner via a utility pole or a tower, and detecting, by an engineering work detection means, occurrence of an engineering work in a periphery of the utility pole or the tower, based on a vibration pattern of the utility pole or the tower that is indicated by the optical signal.

[Supplementary Note 11]

The engineering work detection method according to Supplementary Note 10, further including executing, by an output control means, control for outputting an alert when detecting, by the engineering work detection means, occurrence of the engineering work.

[Supplementary Note 12]

The engineering work detection method according to Supplementary Note 10 or 11, further including detecting, by the engineering work detection means, an area in which the engineering work occurs.

[Supplementary Note 13]

The engineering work detection method according to any one of Supplementary Notes 10 to 12, further including detecting, by a deterioration detection means, deterioration of the optical fiber cable, based on a characteristic included in the optical signal.

[Supplementary Note 14]

The engineering work detection method according to Supplementary Note 13, further including detecting, by the deterioration detection means, presence or absence of the deterioration, and detecting a degree of the deterioration.

[Supplementary Note 15]

The engineering work detection method according to Supplementary Note 13, further including detecting, by the deterioration detection means, an indication of the deterioration.

[Supplementary Note 16]

A recording medium recording a program for causing a computer to function as:

an optical signal reception means for receiving an optical signal from an optical fiber cable provided in an overhead manner via a utility pole or a tower; and an engineering work detection means for detecting occurrence of an engineering work in a periphery of the utility pole or the tower, based on a vibration pattern of the utility pole or the tower that is indicated by the optical signal.

[Supplementary Note 17]

The recording medium according to Supplementary Note 16, wherein the program causes the computer to function as an output control means for executing control for outputting an alert when detecting, by the engineering work detection means, occurrence of the engineering work.

[Supplementary Note 18]

The recording medium according to Supplementary Note 16 or 17, wherein the engineering work detection means detects an area in which the engineering work occurs.

[Supplementary Note 19]

The recording medium according to any one of Supplementary Notes 16 to 18, wherein the program causes the computer to function as a deterioration detection means for detecting deterioration of the optical fiber cable, based on a characteristic included in the optical signal.

[Supplementary Note 20]

The recording medium according to Supplementary Note 19, wherein the deterioration detection means detects presence or absence of the deterioration, and detects a degree of the deterioration.

[Supplementary Note 21]

The recording medium according to Supplementary Note 19, wherein the deterioration detection means detects an indication of the deterioration.

REFERENCE SIGNS LIST

1 Utility pole
2 Optical fiber cable
3 Optical communication device
4 Filter unit
5, 5a Engineering work detection device
6 Output device
7 Tower
11 Optical signal reception unit
12 Engineering work detection unit
13, 13a Output control unit
14 Degradation detection unit
21 Computer
31 Receiver
32 Processor
33 Memory
34 Processing circuit
100, 100a Engineering work detection system

What is claimed is:

1. A detection device comprising:

an optical signal reception unit configured to receive an optical signal from an optical fiber cable provided in an overhead manner via a utility pole or a tower;

at least one memory configured to store instructions; and at least one processor configured to execute the instructions to:

detect occurrence of an engineering work in a periphery of the utility pole or the tower, based on a vibration pattern of the utility pole or the tower that is indicated by the optical signal; and detect deterioration of the optical fiber cable based on a time-series change of the vibration pattern.

2. The detection device according to claim 1, wherein the at least one processor is configured to execute the instructions to control for outputting an alert in a case where the at least one processor detects occurrence of the engineering work.

3. The detection device according to claim 1, wherein the at least one processor is configured to execute the instructions to detects an area in which the engineering work occurs.

4. The detection device according to claim 1, wherein the at least one processor is configured to execute the instructions to:

detect presence or absence of the deterioration; and
detect a degree of the deterioration.

5. The detection device according to claim 1, wherein the at least one processor is configured to execute the instructions to detect an indication of the deterioration.

6. A detection system comprising:

the detection device according to claim 1; and
the optical fiber cable.

7. The detection system according to claim 6, wherein the optical fiber cable is provided inside an overhead ground wire.

8. The detection system according to claim 6, wherein the optical fiber cable is dedicated for communication or sensing.

9. The detection device according to claim 2, wherein the at least one processor is configured to execute the instructions to detect an area in which the engineering work occurs.

10. The detection device according to claim 2, wherein the at least one processor is configured to execute the instructions to:

detect presence or absence of the deterioration; and
detect a degree of the deterioration.

11. The detection device according to claim 2, wherein the at least one processor is configured to execute the instructions to:

detect presence or absence of the deterioration; and
detect an indication of the deterioration.

12. The detection device according to claim 1, wherein the at least one processor is configured to execute the instructions to detect the deterioration of the optical fiber cable based on a comparison result between a reference value and either one of an attenuation time calculated from a time waveform indicating the vibration pattern and a peak frequency detected from a frequency spectrum indicating the vibration pattern.

13. The detection device according to claim 12, wherein the at least one processor is configured to execute the instructions to detect a degree of the deterioration of the optical fiber cable corresponding to a change amount of the attenuation time or the peak frequency with respect to the reference value.

14. The detection device according to claim 12, wherein the reference value corresponding to the attenuation time is an attenuation time in a time waveform indicating a vibration pattern in a case where the deterioration does not occur at a deterioration detection target part of the optical fiber cable, and wherein the reference value corresponding to the peak frequency is a peak frequency in a frequency spectrum indicating a vibration pattern in a case where the deterioration does not occur at the deterioration detection target part of the optical fiber cable.

15. A detection method comprising:

receiving, by an optical signal reception unit, an optical signal from an optical fiber cable provided in an overhead manner via a utility pole or a tower;

detecting, by at least one processor, occurrence of an engineering work in a periphery of the utility pole or the tower, based on a vibration pattern of the utility pole or the tower that is indicated by the optical signal; and detecting, by the at least one processor, deterioration of the optical fiber cable based on a time-series change of the vibration pattern.

16. The detection method according to claim 15, further comprising executing, by the at least one processor, control for outputting an alert in a case where the at least one processor, detects occurrence of the engineering work.

17. The detection method according to claim 15, further comprising detecting, by the at least one processor, an area in which the engineering work occurs.

18. The detection method according to claim 15, further comprising:

detecting, by the at least one processor, presence or absence of the deterioration; and detecting, by the at least one processor, a degree of the deterioration.

19. The detection method according to claim 15, further comprising detecting, by the at least one processor, an indication of the deterioration.

* * * * *